United States Patent
Nelson et al.

(10) Patent No.: US 10,447,993 B2
(45) Date of Patent: Oct. 15, 2019

(54) STEREOSCOPIC 360 DEGREE DIGITAL CAMERA SYSTEMS

(71) Applicant: LADUMA, INC., Salt Lake City, UT (US)

(72) Inventors: Christian Serge Nelson, Lehi, UT (US); Dorian T. G. Tolman, Salt Lake City, UT (US)

(73) Assignee: LADUMA, INC., Salt Lake City, UT (US)

( * ) Notice: Subject to any disclaimer, the term of this patent is extended or adjusted under 35 U.S.C. 154(b) by 0 days.

(21) Appl. No.: 15/716,422

(22) Filed: Sep. 26, 2017

(65) Prior Publication Data

US 2018/0091796 A1    Mar. 29, 2018

Related U.S. Application Data

(60) Provisional application No. 62/400,536, filed on Sep. 27, 2016.

(51) Int. Cl.
| | |
|---|---|
| *H04N 5/225* | (2006.01) |
| *H04N 13/243* | (2018.01) |
| *H04N 5/247* | (2006.01) |
| *H04N 5/232* | (2006.01) |

(52) U.S. Cl.
CPC ......... *H04N 13/243* (2018.05); *H04N 5/2252* (2013.01); *H04N 5/2258* (2013.01); *H04N 5/23238* (2013.01); *H04N 5/247* (2013.01)

(58) Field of Classification Search
CPC .......................... H04N 13/0242; H04N 5/2252
USPC .................................................. 348/38, 373
See application file for complete search history.

(56) References Cited

U.S. PATENT DOCUMENTS

| | | | |
|---|---|---|---|
| 6,747,686 B1 | 6/2004 | Bennett | |
| 7,463,280 B2 | 12/2008 | Steuart, III | |
| 8,175,314 B1* | 5/2012 | Webster | H04R 1/083 381/122 |
| 9,152,019 B2* | 10/2015 | Kintner | G03B 17/561 |
| 2008/0164316 A1* | 7/2008 | Patel | G06K 7/10 235/462.43 |
| 2010/0201781 A1* | 8/2010 | Trubko | G02B 13/06 348/36 |

(Continued)

FOREIGN PATENT DOCUMENTS

CA    2933704 A1    6/2015

*Primary Examiner* — Jamie J Atala
*Assistant Examiner* — James T Boylan
(74) *Attorney, Agent, or Firm* — Loza & Loza, LLP; Tyler J. Barrett

(57) ABSTRACT

Stereoscopic 360° video recording devices are adapted to facilitate capture of stereoscopic 360° images. According to one example, a stereoscopic 360° video recording device may include an enclosure with three sides of equal length in a triangular configuration. Six digital camera slots may be included within the enclosure, with each of the three sides including two digital camera slots. A fan may be coupled to a surface of the enclosure to facilitate cooling of digital cameras retained within the enclosure. A digital video camera may be secured within each of the digital camera slots, wherein each digital video camera includes a predefined interaxial distance from a respective digital video camera on its left and a respective digital video camera on its right. Other aspects, embodiments, and features are also included.

5 Claims, 8 Drawing Sheets

(56) References Cited

U.S. PATENT DOCUMENTS

| | | | |
|---|---|---|---|
| 2011/0199481 A1* | 8/2011 | Silis | G06F 1/20 348/143 |
| 2012/0105574 A1* | 5/2012 | Baker | G03B 35/08 348/36 |
| 2014/0267596 A1* | 9/2014 | Geerds | H04N 5/2252 348/38 |
| 2015/0341617 A1* | 11/2015 | Cole | G03B 17/561 348/36 |
| 2015/0358539 A1* | 12/2015 | Catt | G06T 7/593 348/38 |
| 2016/0212409 A1 | 7/2016 | Cole et al. | |
| 2016/0353089 A1* | 12/2016 | Gallup | G02B 27/0172 |

* cited by examiner

STEREOSCOPIC 360 DEGREE DIGITAL CAMERA SYSTEMS

PRIORITY CLAIM

The present Application for Patent claims priority to Provisional Application No. 62/400,536 entitled "Stereoscopic 360 Degree Digital Camera System" filed Sep. 27, 2016, and assigned to the assignee hereof and hereby expressly incorporated by reference herein.

TECHNICAL FIELD

The technology discussed below relates generally to recording devices, and more specifically to stereoscopic digital camera systems for capturing 360 degrees of three-dimensional imagery.

BACKGROUND

Recently, virtual reality has become popular in many applications. Virtual reality generally refers to generating realistic images, sounds and other sensations to replicate a real environment or an imaginary setting, and simulate a user's physical presence in this environment to enable the user to interact with this space. A person having virtual reality equipment is typically able to "look around" the generated world, move about in it, and interact with features or items that are depicted. Modernly, a user may interact with a virtual reality environment through a computer monitor, a projector screen, or a virtual reality headset (or head-mounted display, which may include glasses, goggles, or other similar configurations).

In some implementations, virtual reality media may be generated by capturing video and/or photographs of a real-world environment. For example, a virtual reality video camera system may capture video of a location or event. The captured video can be subsequently processed to enable a user to view and interact with the location or event as if they are actually present at the location or event.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate capturing of 360° images from a plurality of digital cameras. One or more aspects of the present disclosure relate to stereoscopic 360° video recording devices. In at least one embodiment, such devices may include an enclosure three sides of equal lengths in a triangular configuration. Six digital camera slots may be included within the enclosure, where each of the three sides includes two digital camera slots. A fan may be coupled to a surface of the enclosure.

Additional aspects of the present disclosure include stereoscopic 360° video recording systems. According to at least one embodiment, such systems may include an enclosure with three sides forming a triangular configuration, each side including two digital camera slots. A digital video camera may be secured within each of the digital camera slots, where each digital video camera includes an interaxial distance between 62 millimeters and 100 millimeters from a respective digital video camera on its left and a respective digital video camera on its right, and where each digital video camera is secured at a zero degree pitch angle.

Still further aspects of the present disclosure include methods of capturing 360° digital images. According to at least one embodiment, such methods may include positioning six digital video cameras in a triangular configuration, with two digital video cameras on each side. Each digital video camera may be positioned with an interaxial distance between 62 millimeters and 100 millimeters from adjacent digital video cameras, and with a pitch of zero degrees. Images may be simultaneously captured on each digital video camera.

Yet further aspects of the present disclosure include methods of making a stereoscopic 360° video recording system. According to one or more embodiments, such methods may include forming an enclosure with three lateral sides of equal lengths in a triangular configuration. Six digital camera slots may be formed within the enclosure, with two video camera slots positioned on each lateral side of the enclosure. A fan may also be coupled to a surface of the enclosure.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components may be shown in block diagram form to avoid obscuring the described concepts and features.

The illustrations presented herein are, in some instances, not actual views of any particular stereoscopic 360° video recording enclosure, video camera, or stereoscopic 360° video recording assembly, but are merely idealized representations which are employed to describe the present disclosure. Additionally, elements common between figures may retain the same numerical designation.

Figure 1:
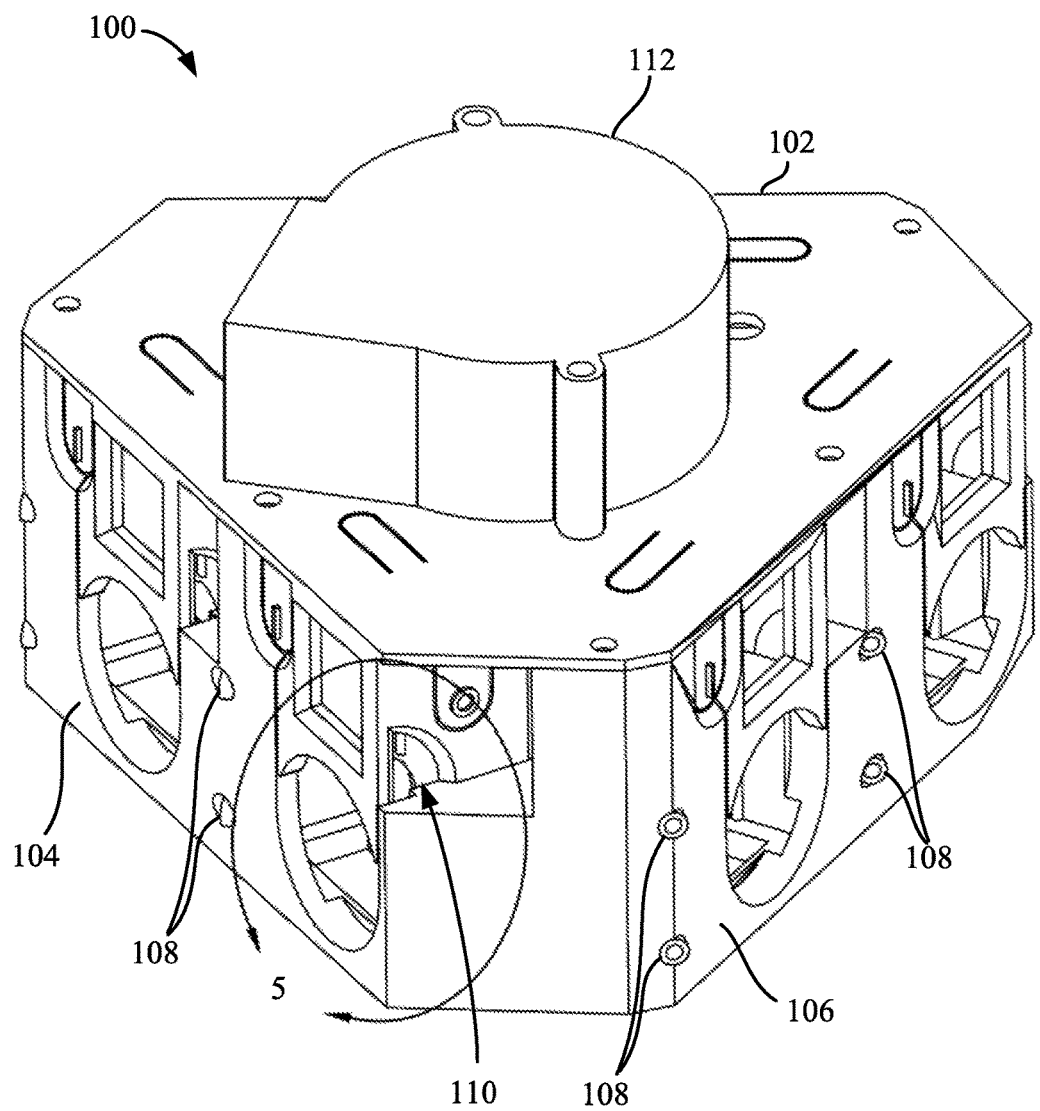
FIG. 1 is an isometric view of a stereoscopic 360° video recording enclosure according to at least one example.

Various embodiments of the present disclosure include stereoscopic 360° video recording systems and assemblies. Referring to FIG. 1, an isometric view of a stereoscopic 360° video recording enclosure 100 is shown according to at least one example of the present disclosure. The enclosure 100 is generally shaped in triangular fashion when viewed from the top or bottom, and includes three side surfaces 102, 104, and 106 of at least substantially equal lengths.

Figure 2:
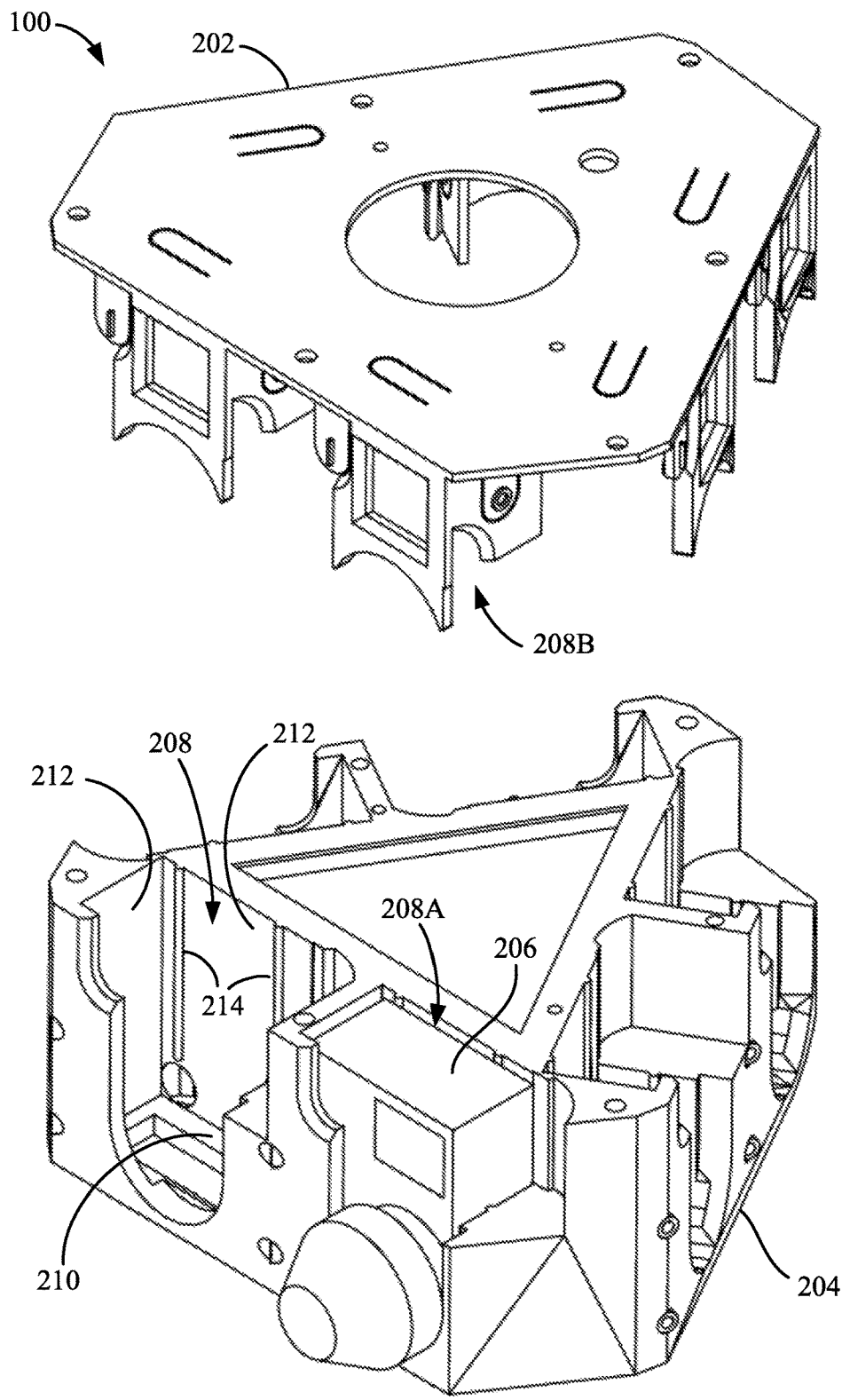
FIG. 2 is an isometric exploded view of a stereoscopic 360° video recording enclosure according to at least one example.

As shown in FIG. 2, the stereoscopic 360° video recording enclosure 100 can include a top component 202 and a base 204. The top component 202 and the base 204 can be fitted together to at least partially enclose a plurality of digital video cameras therein, such as the digital video camera 206 shown in FIG. 2 with a cap over its lens, within a respective video camera slot 208. That is, the top component 202 and the base 204 can form a plurality of video camera slots 208 when coupled together. Each video camera slot 208 may include a slot base 210 and slot sidewalls 212 configured to collectively surround at least a portion of a digital video camera 206 when positioned within a respective video camera slot 208. As depicted in FIG. 2, the digital video camera 206 is positioned within the base portion of the slot (identified as 208A) formed by the based 204, and a respective top portion of the slot (identified as 208B) is formed by the top component 202.

As can be seen in FIGS. 1 and 2, each of the side surfaces (e.g., 102, 104, 106 in FIG. 1) of the enclosure 100 includes two video camera slots 208. Each video camera slot 208 is sized and shaped to receive a respective digital video camera 206. The specific size and shape of the video camera slots 208 can be configured based on the specific type of digital video camera 206 that will be positioned therein. As depicted, the video camera slots 208 are positioned so that all six of the digital video cameras 206 are positioned within at least substantially the same vertical plane. That is, none of the digital video cameras 206 within the video camera slots 208 are arranged on the y-axis substantially higher or lower than another digital video camera 206.

Figure 3:
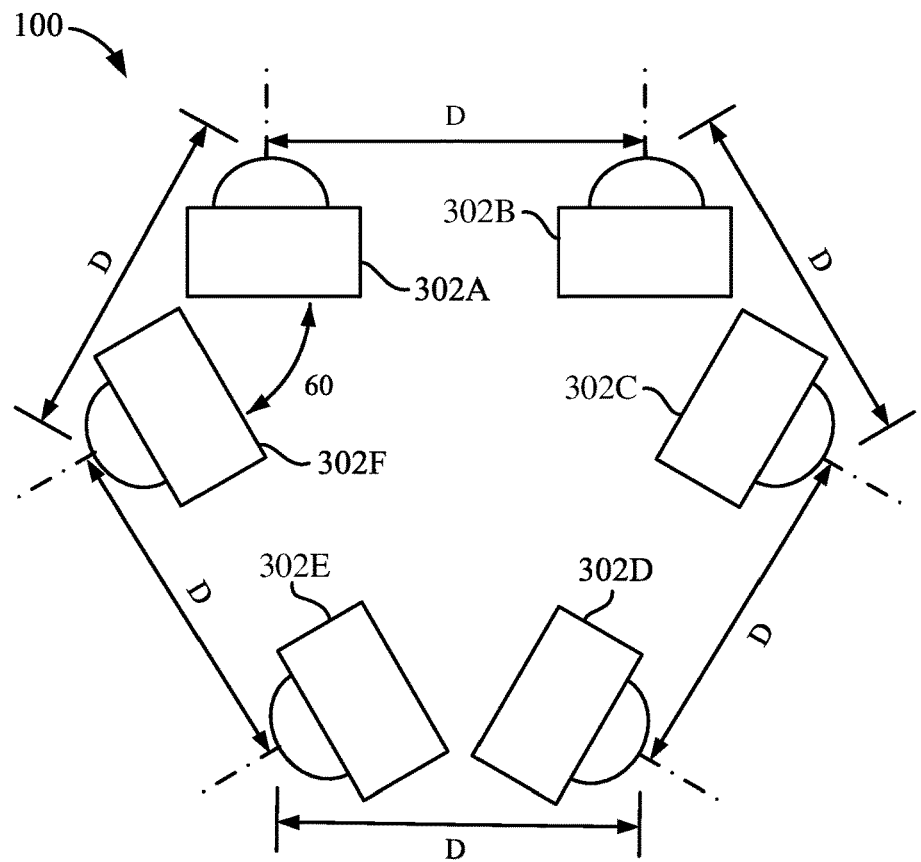
FIG. 3 illustrates a top view of a block diagram for a digital video camera arrangement according to at least one aspect of the present disclosure.

The video camera slots 208 are positioned in the enclosure 100 to provide an equidistance spacing on the x-axis between the centers of adjacent digital video camera lenses. For example, FIG. 3 illustrates a top view of a digital video camera arrangement according to at least one aspect of the present disclosure. As shown, six digital video cameras 302A, 302B, 302C, 302D, 302E, and 302F are shown in the triangular orientation of the enclosure 100 in FIG. 1. Each digital video camera may employ an ultra-wide-angle lens to facilitate capture of photo and/or video images at a relatively wide angle. In at least one embodiment, the ultra-wide-angle lens of each digital video camera is configured to capture images across a 220° field of view. In other embodiments, the ultra-wide-angle lens for each digital video camera may be configured to capture images across a field of view greater than 220°. In still other embodiments, each digital video camera may employ a lens with smaller fields of view according to various aspects of the present disclosure. Accordingly, the specific lens employed, if any, may be selected as desired by the user.

Each digital video camera works in a stereo camera pair with one or more other digital video cameras. For example, the digital video camera 302A operates as the left side of a stereo camera pair with the digital video camera 302B, and operates as the right side of a stereo camera pair with the digital video camera 302F. An ultra-wide-angle lens enables the digital video cameras 302A and 302F to capture overlapping imagery to enable the two digital video cameras to operate as a stereo camera pair, even though they are facing in considerably different directions in the triangular setup described and depicted. The images captured by each stereo camera pair may later be used to display a left screen and a right screen for a viewer. For example, a user viewing the captured images may view the imagery captured by the left side of a stereo camera pair (e.g., from digital video camera 302A, 302C, 302E) with their left eye, and the imagery captured by the right side of the stereo camera pair (e.g., from digital video camera 302B, 302D, 302F) with their right eye to create a three-dimensional image viewable by the user. In some implementations, a virtual reality viewer display is employed, with a first screen configured to expose the left eye to the imagery captured by the left side of a stereo camera pair, and a second screen configured to expose the right eye to the imagery captured by the right side of a stereo camera pair. In other implementations, other viewing options may be employed to isolate the images to the respective eyes, such as 3D glasses, as known generally in the art.

According to one or more aspects of the present disclosure, employing just six digital video cameras can facilitate high quality 360° images with reduced post-processing. That is, post-processing typically includes combining the images captured from each individual camera into a single 360° image. By reducing the number of digital cameras employed compared to conventional recording systems, the quantity of post-processing is significantly reduced. The digital video cameras can be any digital camera available. By way of example and not limitation, the digital video cameras may be digital video cameras sold under the trademark GOPRO HERO 4, KODAK PIXPRO SP360 4K, etc.

According to at least one embodiment of the present disclosure, the interaxial (also known as "interocular") separation between any adjacent digital video cameras is at least substantially the same. For example, the distance between the center of the lenses for digital video cameras 302A and 302B is at least substantially equal to D. Additionally, the distance between the center of the lenses for digital video cameras 302A and 302F is also at least substantially equal to D. According to various embodiments, the distance D may be selected as desired. Often, the distance D is suggested to be 65-68 millimeters, and the distance D can accordingly be selected as such in one or more embodiments. In at least one embodiment of the present disclosure, however, the distance D is configured to be approximately 62 mm In one or more other embodiments, the interaxial separation between digital video cameras on the same side of the triangular shape may be a first value, while the interaxial separation between adjacent digital video cameras on different sides of the triangular shape may be a second value that is greater than the first value. For example, the distance D between digital video cameras 302A and 302B may be a first value. Similarly, the distance D between digital video cameras 302C and 302D, and the distance D between digital video cameras 302E and 302F can also be the first value. The distance D between the digital video cameras 302A and 302F, however, can be the second value that is greater than the first value. Similarly, the distance D between digital video cameras 302E and 302D, and digital video cameras 302B and 302C can be the second value. Typically, the second value is determined as a result of the size of the digital video cameras. In at least one example, the first value is selected from a range between about 62 mm and 68 mm, and the second value is greater than the first value as a result of the size and shape of the digital video cameras (e.g., 75 mm-100 mm). In at least one embodiment, the first value may be 62 mm and the second value may be 82 mm In one or more other embodiments, the first value may be 65 mm and the second value may be 95 mm In one or more embodiments, the second value is selected to be as close to the first value as the physical size and shape of the digital video cameras will permit.

Figure 4:
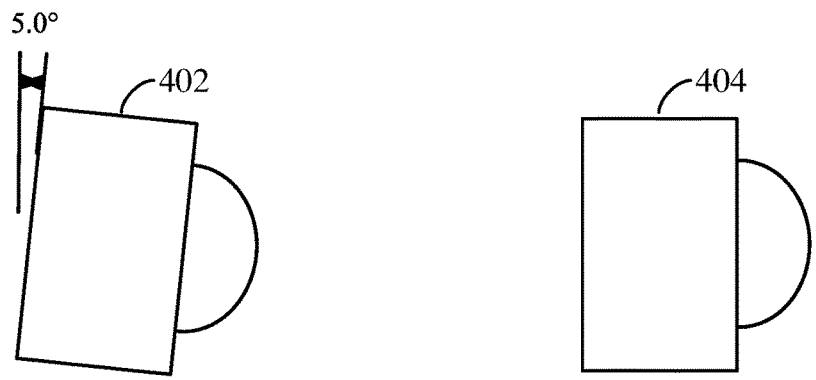
FIG. 4 are side views of block diagrams for digital video cameras positioned with a five degree pitch and a zero degree pitch.

According to one or more further aspects of the present disclosure, the video camera slots 208 in the enclosure 100 are configured to retain the digital video cameras at a pitch of at least substantially zero degrees (0°). Typically, the digital video cameras of a stereoscopic 360° video recording system are positioned with a pitch greater than zero. For instance, FIG. 4 is a block diagram illustrating a side view of two different digital video cameras. The digital video camera 402 on the left is positioned with a pitch of about five degrees (5°) downward, or toward the ground. This represents a typical pitch amount. The digital video camera 404 on the right of FIG. 4 is positioned with no downward pitch (i.e., a pitch of zero degrees (0°)).

In some embodiments, the slot base 210 and the slot sidewalls 212 of each video camera slot 208 (see, e.g., FIG. 2) can be shaped and configured to maintain a respective digital video camera at the desired pitch (e.g., zero degrees (0°), five degrees) (5°), etc.). In other embodiments, the enclosure 100 includes one or more set screws associated with each video camera slot 102. For example, in the embodiment depicted in FIG. 1, the enclosure 100 can include at least one threaded aperture 108 into which a respective set screw can be positioned. With reference to FIGS. 1 and 2, the set screw in each threaded aperture 108 can be adjusted inward or outward to adjust a pressure applied against a portion of the digital video camera 206 within a respective video camera slot 208. The pressure can push the respective digital video camera 206 against one or more sidewalls 212 of the respective video camera slot 208 to orient the digital video camera with the desired pitch (e.g., zero degrees (0°), five degrees (5°), etc.).

Figure 5:
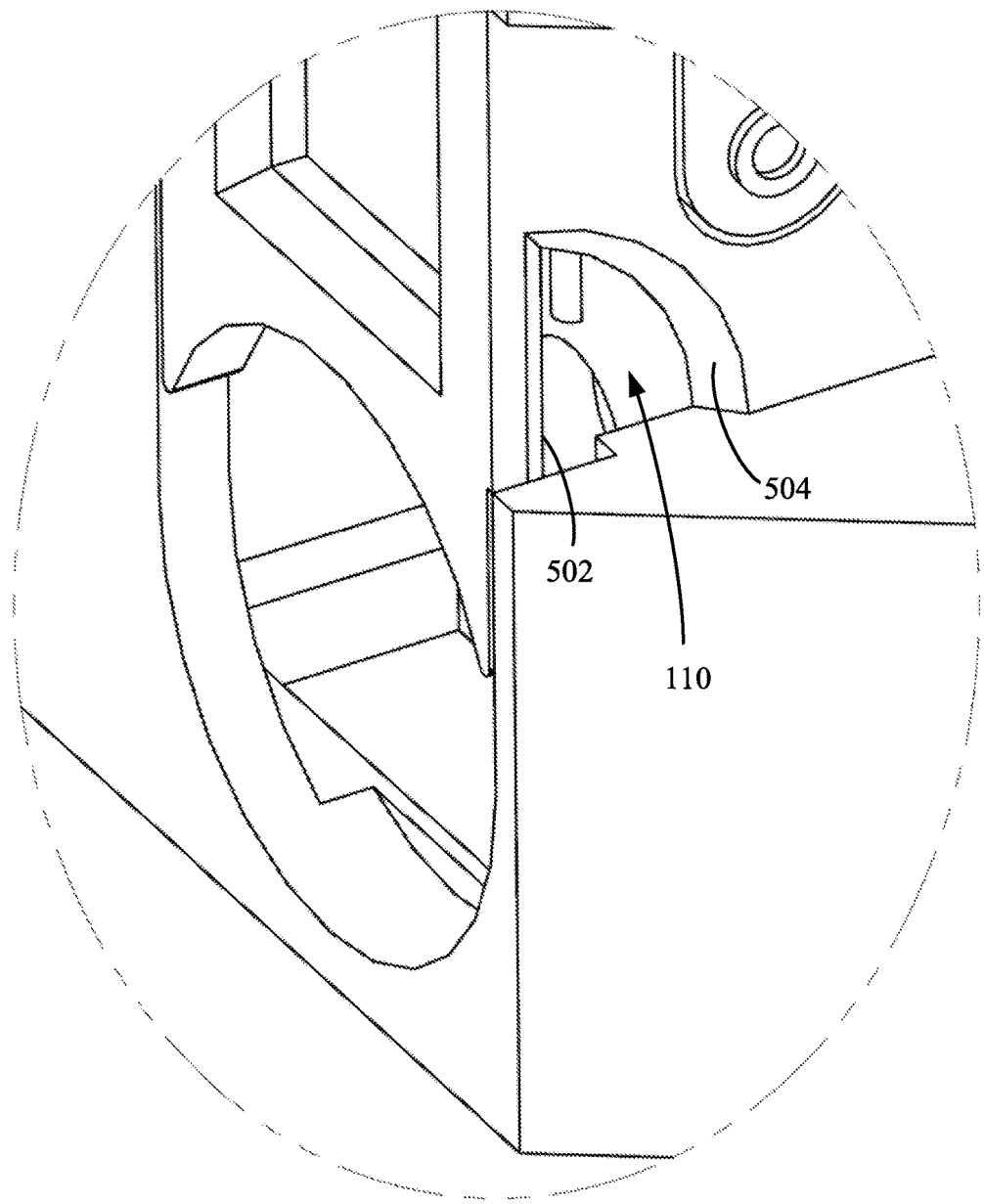
FIG. 5 is a magnified view of a microphone aperture in the enclosure of FIG. 1 according to at least one example.

In one or more embodiments, the enclosure 100 can further include apertures associated with one or more microphones included with the digital video cameras. For example, in the embodiment shown in FIG. 1, the enclosure 100 includes a microphone aperture 110 associated with each video camera slot 208. FIG. 5 is a magnified view of a microphone aperture 110 in FIG. 1 according to at least one example. As shown, the microphone aperture 110 includes a vertical surface 502 (as oriented in FIG. 5) located toward a forward surface of the enclosure 100 (e.g., toward the direction where each camera lens faces), with the surface generally facing in the opposite direction, away from a direction that a center of a lens of the digital video camera is facing. The vertical surface 502 may extend parallel or substantially parallel to the respective side 102, 104, 106 of the enclosure to which it is associated. The microphone aperture 110 further includes an arcuate surface 504 extending from a top edge of the vertical surface 502 (as oriented in FIG. 5) and arcuately extending away from the vertical surface 502 and downward (as oriented in FIG. 5). The arcuate surface 504 is sized and configured to extend around a portion of the microphone included in the digital video camera when positioned within the video camera slot 208. The arcuate surface 504 is further configured to face generally in the same direction that a lens of the digital video camera is facing.

Referring back to FIG. 1, the enclosure 100 can further include a cooling system including a fan 112, openings between the outside and inside of the enclosure 100, and airflow passageways or channels formed into inside surfaces of the enclosure. The fan 112 is located at a top surface of the enclosure 100 and is configured to pull air through apertures located on a bottom surface of the enclosure 100, through airflow passageways (e.g., passageway channel formed on slot sidewall 212 between protrusions 214 in FIG. 2) and out the top. According to at least one embodiment, the airflow passageways are formed on the inside surfaces of the enclosure 100 to direct air across one or more surfaces of the digital video cameras. More specifically, the airflow passageways are configured to form a channel between the inside surface of the enclosure 100 and a digital video camera positioned in a respective video camera slot 208. Such airflow passageways are located to cause air to flow across surfaces of the digital video camera that are known to get relatively hot. Accordingly, the specific configuration and location of the airflow passageways may be determined based on the specific digital video cameras for which the enclosure 100 is configured to utilize.

In one or more embodiments, the fan 112 may be a variable fan for which the rotations per minute can be adjusted in response to external and/or internal temperatures. Typically, a fan 112 will produce some noise, which may be undesirable when recording video and audio. Accordingly, the variable speed fan 112 can be operated at lower speeds when temperatures allow to reduce the noise generated by the fan 112.

Figure 6:
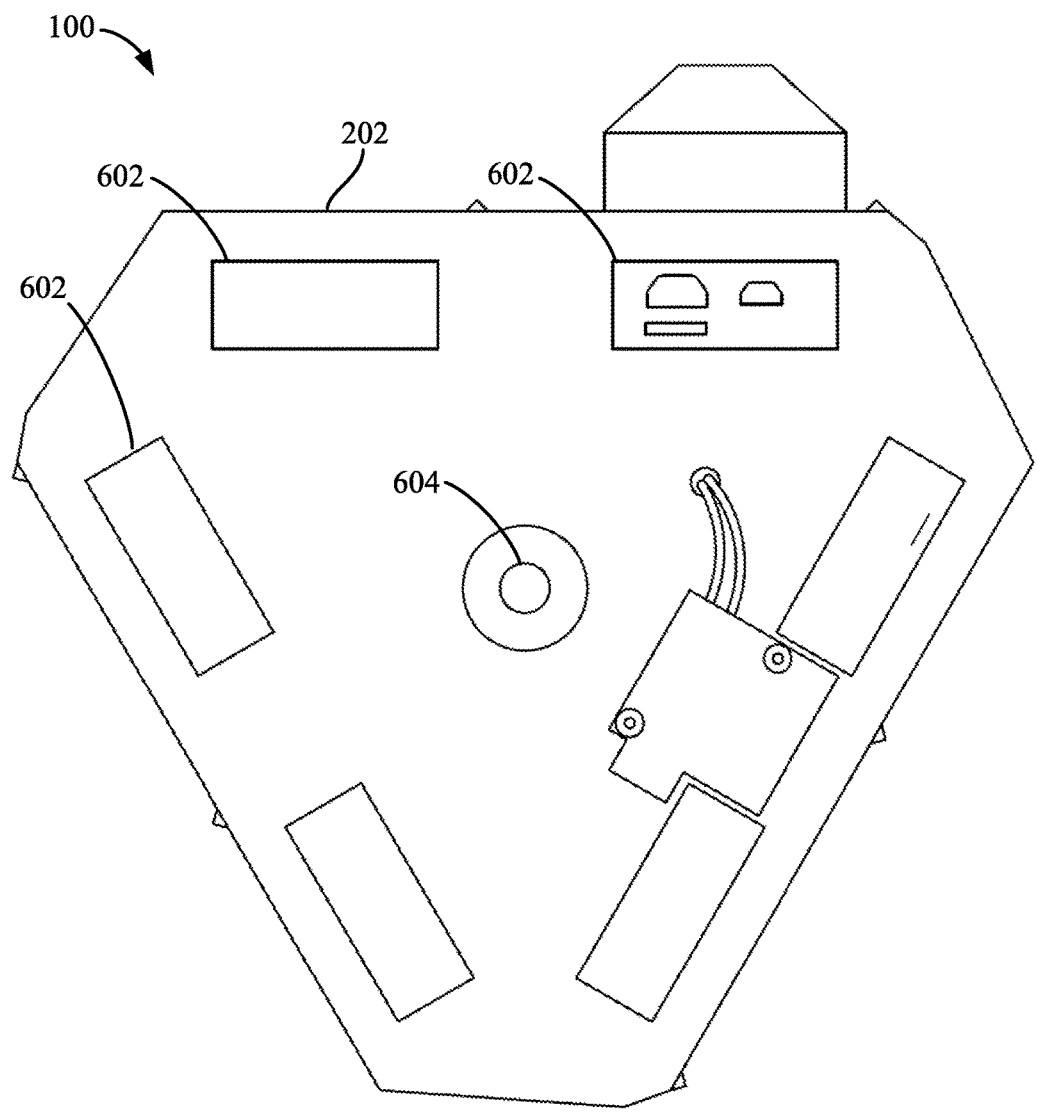
FIG. 6 is a bottom view of a base portion of an enclosure according to at least one example.

Referring to FIG. 6, a bottom view of an enclosure 100 is depicted according to at least one example. As shown, the base 202 may include openings 602 associated with each digital video camera to facilitate access to one or more ports of the digital video cameras. A threaded connector 604 may also be coupled to the base 202 to facilitate coupling of the enclosure 100 to a stand, such as a tripod camera stand, as depicted in FIG. 7.

Figure 7:
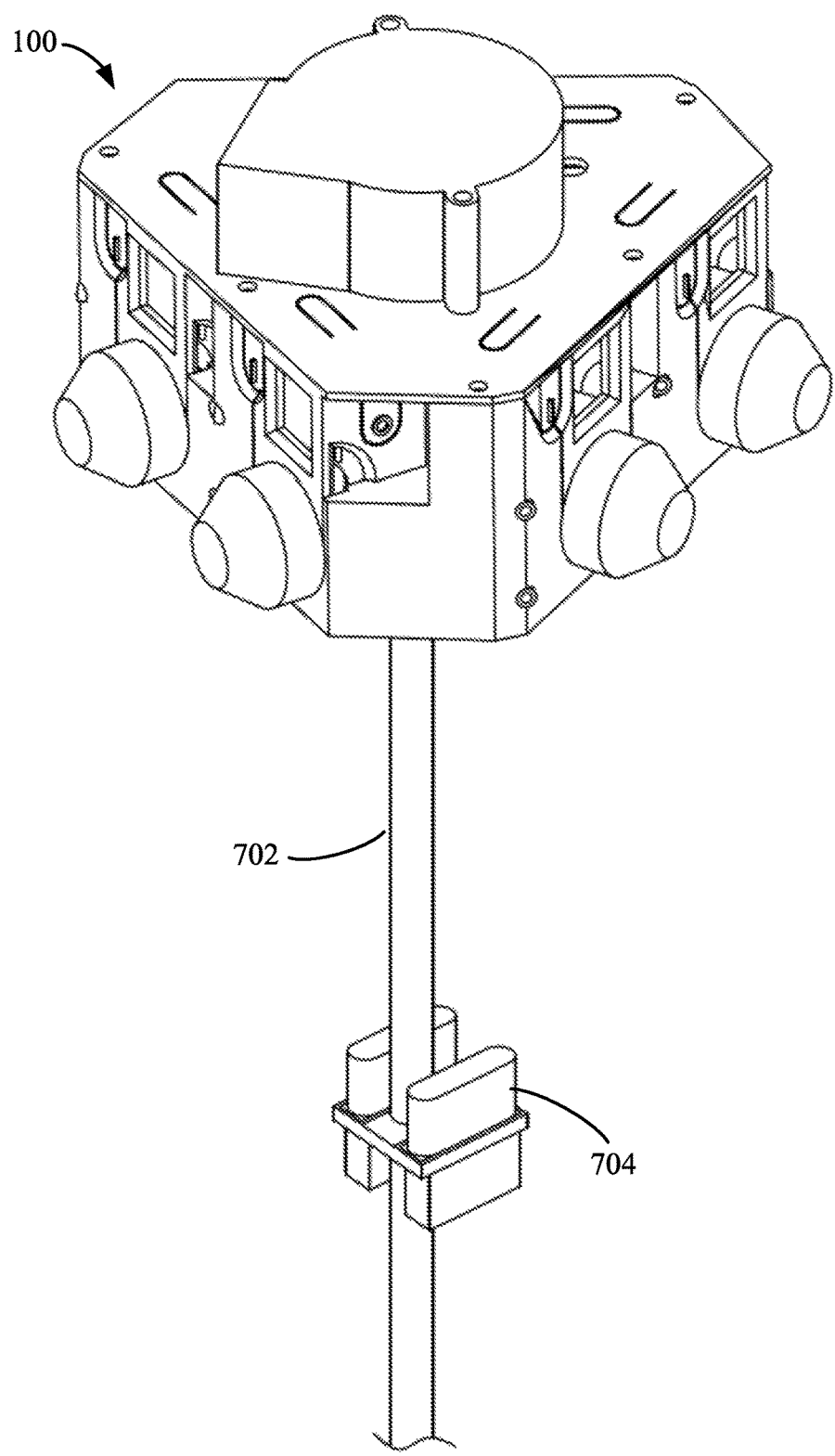
FIG. 7 is an isometric view of an enclosure connected to a stand including a battery pack configuration coupled thereto and with digital video cameras positioned within respective video camera slots.

Referring to FIG. 7, the enclosure 100 is coupled to a stand 702. According to one or more aspects of the disclosure, a battery pack 704 may be coupled to the stand 702. The battery pack 704 can provide power to the six digital video cameras by means of USB connections between the battery pack and each of the digital video cameras, according to at least one embodiment. In other embodiments, the cameras may be powered by alternate means.

Figure 8:
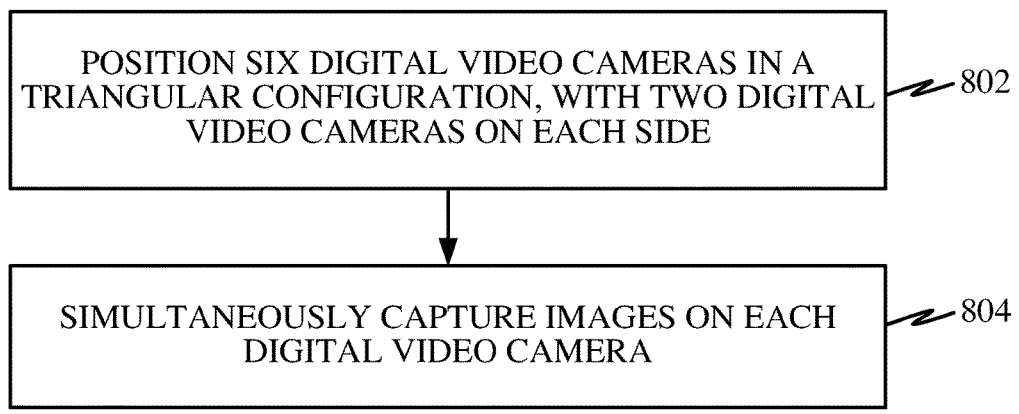
FIG. 8 is a flow diagram depicting an example of capturing stereoscopic 360° digital images according to at least one implementation of the present disclosure.

Additional aspects of the present disclosure include methods of capturing 360° digital images. FIG. 8 is a flow diagram depicting an example of capturing 360° digital images according to at least one implementation of the present disclosure. With reference to FIGS. 1-3, and 8, six digital video cameras may be positioned in a triangular configuration with two digital video cameras on each side 102, 104, 106 of the triangular configuration at 802. According to various implementations, the digital video cameras may be positioned with interaxial distances between about 62 mm and about 100 mm from adjacent digital video cameras as discussed previously with reference to FIG. 3. In some implementations, the interaxial distance between each digital video camera can be the same. In other implementations, the interaxial distance between digital video cameras positioned on a same side of the triangular configuration can be a first distance, and the interaxial distance between adjacent digital video cameras positioned on different sides of the triangular configuration can be a second distance, greater than the first distance. Additionally, each digital video camera may be positioned with varying pitch, such as a pitch of zero degrees in some implementations and a pitch greater than zero degrees in other implementations, as discussed previously with reference to FIG. 4.

At 804, images may be captured simultaneously on each digital video camera. For example, each digital video camera may capture images within its respective field of view simultaneous to the other digital video cameras capturing images in their respective fields of view. As noted previously, the digital video cameras may capture images employing an ultra-wide-angle lens in one or more implementations. In at least some embodiments, the ultra-wide-angle lens may be at least 220°.

In one or more additional implementations, sound may be captured by each digital video camera through a microphone aperture 110 as described above with reference to FIG. 5. Additionally, the enclosure 100 may include the fan 112 to force air across one or more portions of the digital video cameras, as described above.

Figure 9:
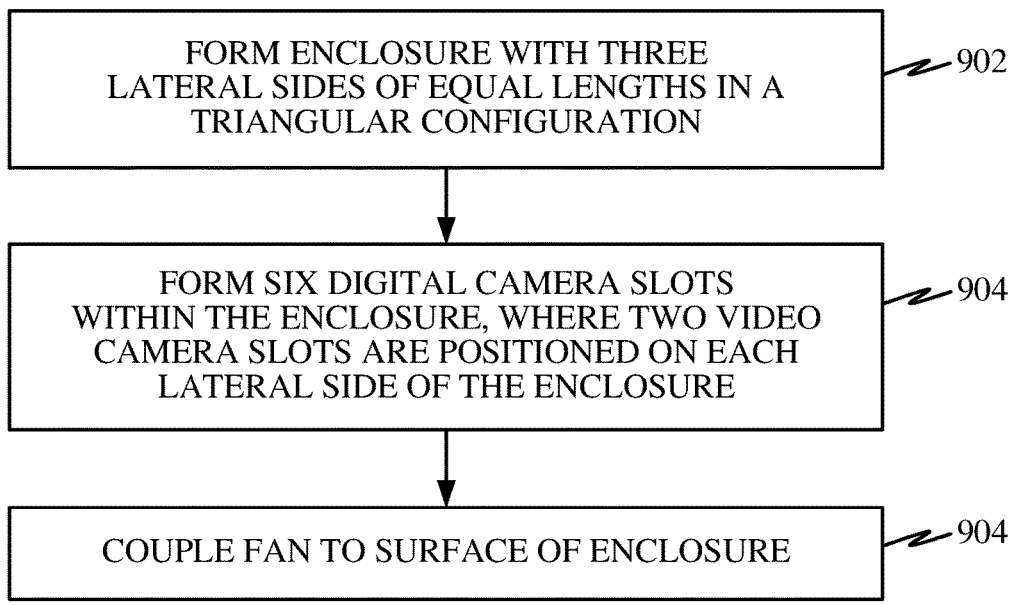
FIG. 9 is a flow diagram depicting select operations associated with at least one implementation of a method of making a stereoscopic 360° video recording system.

Further aspects of the present disclosure include methods of making stereoscopic 360° video recording systems and assemblies. FIG. 9 is a flow diagram depicting select operations associated with one or more such methods. With reference to FIGS. 1, 2, and 9, an enclosure 100 may be formed at 902. In at least one implementation, the enclosure 100 is formed with three lateral sides 102, 104, 106 of equal lengths positioned in a triangular configuration. In at least one implementation, the enclosure may be formed to include a top component 202 and a base 204.

At 904, six digital camera slots 208 may be formed within the enclosure, with each lateral side 102, 104, 106 including two digital video camera slots 208 per side. In implementations including the top component 202 and the base 204, the digital video camera slots 208 may be defined when the top component 202 is coupled to the base 204.

At 906, a fan may be coupled to a surface of the enclosure. For example, the fan 112 may be coupled to a surface of the enclosure 100. In one or more implementations, at least one airflow passageway may be formed on an inner surface 212 of each digital camera slot 208, wherein each airflow passageway is located and shaped to direct air across one or more surfaces of a digital video camera when the fan 112 is on and when a digital camera is positioned within a digital camera slot 208.

As noted herein, a microphone aperture associated with each digital camera slot can also be formed in the enclosure. Each microphone aperture may include an arcuate surface 504 intersecting a vertical surface 502 and extending arcuately downward from the intersection with the vertical surface 502, as described herein with reference to FIG. 5.

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, features, or functions. Additional elements, components, steps, and/or functions may also be added or not utilized without departing from the present disclosure.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart or a flow diagram. Although a flowchart may describe the operations as a sequential process, many of the operations can be performed in parallel or concurrently. In addition, the order of the operations may be re-arranged. A process is terminated when its operations are completed.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A stereoscopic 360° video recording system, comprising:
    an enclosure including three sides forming a triangular configuration relative to each other, each side including two digital camera slots;
    a digital video camera secured within each of the digital camera slots, wherein each digital video camera forms a stereo camera pair with a respective digital video camera on its left and a respective digital video camera on its right, and is positioned the same interaxial distance from each of the digital video camera on its left and the digital video camera on its right, and wherein each digital video camera is secured at a zero degree pitch angle; and
    a microphone aperture associated with each digital camera slot, each microphone aperture comprising a vertical surface at least substantially parallel to a respective side forming the triangular configuration, and an arcuate surface intersecting a top end of the vertical surface and extending arcuately downward from the intersection with the top end of the vertical surface.

2. The stereoscopic 360° video recording system of claim 1, further comprising a fan coupled to a surface of the enclosure.

3. The stereoscopic 360° video recording system of claim 2, further comprising a plurality of airflow passageways, wherein each airflow passageway extends from an opening within the enclosure along an inside surface of a respective digital camera slot over at least one surface of a respective digital video camera.

4. The stereoscopic 360° video recording system of claim 1, wherein each digital video camera includes an ultra-wide-angle lens of 220° or greater.

5. The stereoscopic 360° video recording system of claim 1, wherein the interaxial distance between each adjacent digital video camera is between 62 millimeters and 100 millimeters.

* * * * *